United States Patent [19]

Perego et al.

[11] Patent Number: 5,767,038
[45] Date of Patent: *Jun. 16, 1998

[54] CATALYST FOR THE HYDROISOMERIZATION OF LONG-CHAIN N-PARAFFINS AND PROCESS FOR PREPARING IT

[75] Inventors: Carlo Perego; Laura Zanibelli, both of Milan; Cristina Flego, Trieste; Alberto Del Bianco, Milan; Giuseppe Bellussi, Piacenza, all of Italy

[73] Assignee: Eniricerche S.p. A., Milan, Italy

[*] Notice: The term of this patent shall not extend beyond the expiration date of Pat. No. 5,444,032.

[21] Appl. No.: 519,759

[22] Filed: Aug. 28, 1995

Related U.S. Application Data

[63] Continuation of Ser. No. 99,650, Jul. 30, 1993, abandoned.

[30] Foreign Application Priority Data

Jul. 31, 1992 [IT] Italy ............................... MI92A1895

[51] Int. Cl.$^6$ .................................................... B01J 21/12
[52] U.S. Cl. ............................ 502/235; 502/261; 502/262
[58] Field of Search .................................. 502/235, 238, 502/258, 261, 262

[56] References Cited

U.S. PATENT DOCUMENTS

| | | |
|---|---|---|
| 3,637,484 | 1/1972 | Hansford . |
| 3,657,153 | 4/1972 | Bucur et al. . |
| 3,855,347 | 12/1974 | Oricchio . |
| 5,139,989 | 8/1992 | Chao et al. ............................ 502/214 |

FOREIGN PATENT DOCUMENTS

| | | |
|---|---|---|
| 0 225 053 | 6/1987 | European Pat. Off. . |
| 0 340 868 | 11/1989 | European Pat. Off. . |

OTHER PUBLICATIONS

Ward et al. *Ind. Eng. Chem. Res.*, "Preparing Catalytic Materials by the Sol–Gel Method", vol. 34, (1995), pp. 421–433.

Bellussi et al. *Studies In Surface Science and Catalysis*, "Amorphous Mesoporous Silica–Alumina With Controlled Pore Size as Acid Catalysts", vol. 84, (1994), pp. 85–92.

*Primary Examiner*—Ponnathapura Achutamurthy
*Attorney, Agent, or Firm*—Oblon, Spivak, McClelland, Maier & Neustadt, P.C.

[57] ABSTRACT

Disclosed is an active catalyst in the hydroisomerization of waxes (paraffins), which catalyst is constituted by a carrier of acidic nature, of silica-alumina gel, and one or more metals belonging to Group VIIIA. Also a process for preparing said catalyst is disclosed.

7 Claims, No Drawings

CATALYST FOR THE HYDROISOMERIZATION OF LONG-CHAIN N-PARAFFINS AND PROCESS FOR PREPARING IT

This application is a continuation of application Ser. No. 08/099,650, filed on Jul. 30, 1993, now abandoned.

The present invention relates to a bifunctional catalyst constituted by an amorphous silica and alumina gel, and one or more metals belonging to Group VIIIA, to the preparation of such a catalyst and to its use in hydroisomerization of long-chain n-paraffins containing more than 15 carbon atoms.

The process of wax isomerization to yield lubricant oil bases characterized by a low pour point and by a high viscosity index, requires the use of suitable catalysts.

In fact, the waxes, mainly constituted (>80% by weight) by n-paraffins containing more than 15 carbon atoms and solid at room temperature, must be converted into their corresponding branched isomers having a higher melting point than their linear isomers.

For example, the n-$C_{16}$ paraffin has a melting point of 19° C., whilst its 5-methyl pentadecane isomer melts at –31° C.

An effective hydroisomerization catalyst should anyway minimize the possible cracking and hydrocracking reactions, which are catalyzed by the same acidic sites, and have, as intermediates, the same carbocations useful for hydroisomerization. These side reactions cause the degradation of the molecule, with less valuable, ligther products being formed, which must be removed from the end product in order not to increase the volatility thereof; the need for such additional removal step obviously increases the general costs of the overall process. For this process, bifunctional catalysts were developed, i.e., catalysts which are provided with both acidic sites and hydro-dehydrogenation active sites. The acidity is given to the catalyst by the type of selected carrier, and its function exactly is supplying the catalysts with such an isomerizing property.

The hydro-dehydrogenating activity is supplied to the catalyst by the deposited metal phase, the function of which is also of keeping cracking reactions to a very minimum.

It was demonstrated (J. F. Le Page, Applied Heterogeneous Catalysis, Ed. Technip, Paris, 1987, 435–466) that, with the hydrogenating activity being the same, the more selective catalysts are those in which the carrier has a controlled acidity, so as to maximize the isomerization of n-paraffins, over cracking reactions. However, inasmuch as the cracking reactions take place after the isomerization reactions, the maximal isomerization selectivity is obtained at low conversion levels (G. Froment et al., Ind. Eng. Chem. Prod. Res. Dev., 1981, 20, 654–660).

The effectiveness of various catalysts can be evaluated on model compounds as n-paraffins, by measuring the selectivity thereof, i.e., the ratio of the isomerization products to the cracking products, at a given level of conversion of n-paraffins.

Among most recent patents, EP-A-321,307 discloses a process for wax hydroisomerization in order to produce lubricant oil bases, which implies a hydroisomerization step carried out in the presence of a particular catalyst. The latter contains from 0.1 to 5% by weight of a metal belonging to Group VI or VIIIA, preferably VIIIA, still more preferably a noble metal of Group VIIIA, in the most preferred form, platinum supported on a halogenated, preferably fluorinated, refractory inorganic oxide.

The halogenation of the inorganic oxide is known to increase the acidity thereof. In particular, the surface acidity of fluorinated aluminas and their catalytic activity in the reactions occurring via carbocation, is a function of their fluorine content (R. Covini, V. Fattore, N. Giordano, J. Catal., 1967, 9, 315–321).

U.S. Pat. No. 4,975,177 discloses a further process for hydroisomerizing waxes, in which provided is a hydroisomerization step carried out in the presence of a catalyst constituted by beta zeolite plus one effective component in hydrogenation-dehydrogenation reaction, preferably a noble metal. This catalyst has a high $SiO_2:Al_2O_3$ ratio, at least equal to 30, preferably higher than 50, for example comprised within the range of from 100 to 500, in order to reduce the acidity thereof and consequently the possible cracking reactions.

As regards the process, both the above cited patents report that wax conversions should be limited to 20–40% by weight, in order to minimize the formation of light products caused by cracking.

The catalyst disclosed in EP-A-321,307 suffers from the drawback that it should be prepared by starting from a highly toxic and corrosive reactant as HF, dissolved in water together with $NH_4F$.

The process disclosed in U.S. Pat. No. 4,975,177 uses a catalyst in which the beta zeolite is prepared according to as disclosed in U.S. Pat. Nos. 3,308,069, 4,419,220 and 4,518,485. Owing to the low ratio of $SiO_2:Al_2O_3$, typical of this beta zeolite, a de-alumination should be carried out by steaming and/or acidic treatment of the starting zeolite in order to obtain acceptable selectivity values. In fact, owing to the high acidity of zeolites, under the hydroisomerization conditions the cracking reaction is very competitive with the isomerization reaction. The de-alumination requires the addition of a further step in the global catalyst synthesis which, with the crystallization being performed under hydrothermal conditions, is, per se, already much more complex than the preparation of an amorphous silica-alumina.

In U.S. Pat. No. 5,049,536, disclosed is an amorphous and microporous silica-alumina gel, active in the processes of isomerization, alkylation, dewaxing and dimerization of linear olefins. Typical characteristics of said material are its high acidity, as compared to conventional amorphous silica-aluminas and the very narrow distribution of its average pore diameter.

The present Applicants found now, according to the present invention, that using a gel of the same type as disclosed in U.S. Pat. No. 5,049,536 as the acidic carrier for limited amounts of metals of Group VIIIA, in particular palladium and platinum, makes it possible a catalyst to be obtained with uniform and controlled porosity, which is effective in paraffin hydroisomerization, also without any treatments with fluorinated compounds.

In accordance therewith, the present invention relates to a bifunctional catalyst comprising:

(a) a carrier of acidic character constituted by an X-ray amorphous silica and alumina gel, with a molar ratio of $SiO_2:Al_2O_3$ comprised within the range of from 30:1 to 500:1, a surface area comprised within the range of from 500 to 1000 $m^2/g$, with a porosity of from 0.3 to 0.6 ml/g, with a diameter of pores prevailingly comprised within the range of from 10 to 30 Angstroms;

(b) one or more metals belonging to Group VIIIA, in amounts comprised within the range of from 0.5 to 5% by weight.

In the preferred embodiment, the acidic carrier of the present invention displays a ratio of $SiO_2:Al_2O_3$ comprised within the range of from 50:1 to 300:1 and a porosity of the order of 0.4–0.5 ml/g, and the noble metal, selected from platinum and palladium, is contained at a level of from 0.1 to 2% by weight.

The silica and alumina gel can be advantageously prepared according to as disclosed in U.S. Pat. No. 5,049,536; in particular, an aqueous solution of a tetra alkyl ammonium hydroxide (TAA-OH), is prepared, in which "alkyl" means ethyl, n-propyl or n-butyl, of a soluble aluminum compound capable of yielding $Al_2O_3$ by hydrolysis, and a soluble silicon compound capable of yielding $SiO_2$ by hydrolysis, with the amount of said constituents in said solution being such that the following molar ratios are complied with:

$SiO_2:Al_2O_3$ from 30:1 to 500:1;

TAA-OH:$SiO_2$ from 0.05:1 to 0.2:1;

$H_2O:SiO_2$ from 5:1 to 40:1;

and the resulting solution is heated in order to cause it to undergo gelation; the resulting gel is dried and is calcined under an inert atmosphere and then under an oxidizing atmosphere.

The metal phase can be added either by impregnation from an aqueous medium, or by ionic exchange.

More particularly, according to the first operating technique, the silica-alumina gel, prepared as disclosed above, is wetted with an aqueous solution of a compound of the selected noble matal, for example chloroplatinic acid or $Pd(NH_3)_4(NO_3)_2$, by operating at room or close-to-room temperatures, and at a pH value of the order of 1–4 pH units. After aqueous impregnation, the solid material is dried, preferably in air, at room or close-to-room temperatures, and is submitted to a thermal treatment under an oxidizing atmosphere, preferably in air. Suitable temperatures for this thermal treatment are comprised within the range of from 200° to 600° C. The conditions are so adjusted that on silica-alumina particles an amount of noble metal is deposited which is comprised within the range of from 0.05 to 5% by weight, preferably of from 0.1 to 2%.

According to the operating technique based on ionic exchange, the silica-alumina gel is suspended in an aqueous solution of a noble metal complex or salt, for example, an aqueous solution of $Pt(NH_3)_4(OH)_2$ or of $Pt(NH_3)_4Cl_2$ or of $Pd(NH_3)_4(NO_3)2$, by operating at room or close-to-room temperatures, and at a pH value comprised within the range of from 6 to 10. After the ionic exchange the solid matter is separated, then is washed with water, is dried and finally is submitted to thermal treatment in an inert or oxidizing atmosphere. Thermal treatment temperatures comprised within the range of from 200° to 600° C. were found useful. The conditions are so controlled, that an amount of noble metal comprised within the range of from 0.05 to 5% by weight, preferably of from 0.1 to 2%, is deposited on silica-alumina particles.

In any cases, after these ionic exchange or aqueous impregnation operations, bifunctional catalysts are obtained which consist of silica-alumina gel carriers loaded with a noble metal, having in general a surface area comprised within the range of from 300 to 900 $m^2$/g.

The best results in terms of catalytic activity in the hydroisomerization process are obtained with the catalysts prepared according to the technique of aqueous impregnation, which display high values of paraffin conversion, together with good results of selectivity to isoparaffins.

In the case when one wishes to operate at low paraffin conversion rates, those catalysts are however preferable which are prepared by means of the ionic exchange technique, and, among these, preferably those which contain palladium which, at low conversion rates, display very good selectivities to isoparaffins.

The catalysts according to the present invention can be activated by drying and/or reduction, preferably by drying and subsequent reduction. The drying is carried out in an inert atmosphere at a temperature comprised within the range of from 100° to 400° C., and the reduction is obtained by means of the thermal treatment of the sample under a reducing atmosphere at temperatures comprised within the range of from 150° to 500° C. These steps, which constitute additional steps to the whole process, result to be essential in order to obtain the desired improvement in the performance of the same catalysts, because they increase the selectivity characteristics thereof.

The catalysts according to the present invention can be used as such, or in combination with suitable inert, solid materials acting as binding agents. For that purpose, oxide compounds of the type of silica, alumina, and titanium, magnesium and zirconium oxides, either taken as individual compounds or combined with one another, result to be suitable. The catalyst and the binder can be mixed in mutual ratios, by weight, comprised within the range of from 30:70 to 90:10 and preferably of from 50:50 to 70:30. The above said two components can be bonded and compacted in their end desired shape, for example, as extrudates or pellets. According to an alternative route, the silica-alumina gel based catalyst loaded with a noble metal can be prepared by starting from the acidic carrier which already is an extrudate form. In that case, the carrier, as a silica-alumina gel extrudate prepared according to the process disclosed in Italian patent application MI 91 A 003276 filed on Dec. 6th, 1991 is impregnated with a suitable aqueous solution of a noble metal compound, then is dried and submitted to thermal treatment according to the same process as disclosed for the acidic carrier in powder form. These steps can be carried out in a similar way also in the case of the ion exchange process.

The catalyst prepared according to the above reported techniques, as such, or bonded with an inert material, is active in the hydroisomerization process, which can be carried out either continuously or batchwise.

The hydroisomerization is advantageously carried out in the presence of hydrogen, at a temperature comprised within the range of from 200° to 540° C., preferably of from 250° to 450° C., and under a pressure comprised within the range of from 25,000 kPa, preferably of from 4,000 to 10,000 kPa.

The effective catalyst amount, expressed as a percent content, by weight, based on the n-paraffin or mixtures of n-paraffins to be hydroisomerized, is generally comprised within the range of from 0.5 to 30% by weight, preferably of from 1 to 15% by weight.

The following experimental examples are reported in order to better illustrate the present invention.

EXAMPLE 1

The material used as the acidic carrier in the catalysts claimed herein, is prepared according to as disclosed in U.S. Pat. No. 5,049,536.

Two grams of aluminum isopropoxide is dissolved at room temperature in 68.5 g of an aqueous solution of tetrapropyl ammonium hydroxide (TPA-OH at 13.35% by weight/weight). The solution is heated up to 60° C. and then 104.1 g of tetraethyl silicate (TES) is added. The resulting mixture displays the following molar ratios:

$SiO_2:Al_2O_3$=102,

TPA-OH:$SiO_2$=0.09, and $H_2O:SiO_2$=15.

By keeping this mixture with stirring at 60° C. during 40 minutes, a homogeneous gel is formed which is dried under a flowing air stream at 90° C., and then is calcined at 550° C. under a flowing nitrogen stream during 3 hours and subsequently under a flowing air stream during a further 10 hours, still at the same temperature.

An X-ray amorphous silica-alumina gel is obtained in a quantitative yield relatively to the initial charged materials.

The so prepared material is used as an acidic carrier on which platinum is deposited by means of an aqueous impregnation.

More particularly, to 10 g of silica-alumina prepared inside a crystallizer, 12.06 ml of an aqueous solution containing $H_2PtCl_6$ (0.45% by weight/volume and (0.6M) HCl is added dropwise, with simultaneously carefully mixing. The reactants are kept into contact with each other for 16 hours, then water is evaporated off during 1 hour at the temperature of 60° C. in air and the sample is subsequently dried, during 2 hours, at 150° C., still in air. The calcination is carried out at 500° C. for 3 hours under a flowing air stream, with the muffle being heated from 23° to 500° C. during a 90 minutes time.

The catalyst characterization data are reported in Table 1.

EXAMPLE 2

The process is carried out with a carrier as from Example 1, by performing the metal phase deposition step by means of the ion exchange method.

To 10 g of amorphous silica-alumina, 80 ml of an aqueous solution of $Pt(NH_3)_4Cl_2$ (0.06% of Pt by weight/volume) and some drops of $NH_4OH$ at 35% by weight, such as to alkalify this suspension at pH=9, are added. The resulting mixture is kept with stirring at room temperature for 1 hour, then is filtered and the filter cake is washed with water. After a 16-hour drying at 110° C. in air, the sample is calcined for 3 hours at 400° C. under a flowing air stream, with a temperature increase ramp of from 23° to 400° C. during 30 minutes.

The characteristics of the catalyst are reported in following Table 1.

EXAMPLE 3

A catalyst is prepared by starting from a same carrier as from Example 1, by performing the metal phase deposition step by means of the ion exchange method.

Ten grams of carrier as disclosed in Example 1 is added, with stirring at room temperature, to 1000 ml of demineralized water. 27.23 ml of $Pd(NH_3)_4(NO_3)_2$ (0.01M) and some drops of $NH_4OH$ at 35%, such as to increase the suspension pH up to about 6, are added; the resulting mixture is kept with stirring for 3 hours at room temperature. The resulting suspension is filtered, the filter cake is washed with water and is allowed to dry at room temperature. The drying takes place at a temperature of 80° C. in air for 3 hours, and the calcination is carried out at 250° C. for 3 hours, under a flowing air stream.

The characteristics of this catalyst are reported in Table 1.

EXAMPLE 4

A catalyst is prepared by starting from a same carrier as from Example 1, by performing the metal phase deposition step by means of the aqueous impregnation method.

A volume of 12.06 ml of an aqueous solution of $Pd(NH_3)_4(NO_3)_2$ (0.005M) is added dropwise to 10 g of the same carrier as obtained from Example 1. The subsequent impregnation steps are carried out as in Example 1. The calcination is carried out at 250° C. during 3 hours under a flowing air stream with a temperature increase rate of 7° C./minute.

The characteristics of this catalyst are reported in Table 1.

EXAMPLE 5 (COMPARISON EXAMPLE)

A reference catalyst is prepared which is constituted by platinum supported on beta zeolite.

Said beta zeolite is prepared under similar conditions to as disclosed in U.S. Pat. No. 3,308,069.

An amount of 59.8 g of an aqueous solution at 40% by weight/weight of tetraethylammonium hydroxide (TEA-OH) and 1.9 g of sodium aluminate are added to 58.4 g of demineralized water. The resulting mixture is heated up to about 80° C. and is kept with stirring until $NaAlO_2$ is completely dissolved. The resulting solution is added to 48.7 g of colloidal silica Ludox HS at 40% by weight, such as to yield a molar ratio of $SiO_2:Al_2O_3=28$.

The resulting homogeneous suspension, having pH=14, is charged to a stainless steel autoclave and is caused to crystallize under hydrothermal conditions in an oven at 150° C. during a 10-day time, under static conditions, under the autogenous pressure.

The crystallized product is filtered off, the filter cake is washed, is dried for 1 hour at 120° C., is calcined during 5 hours at 550° C. and is turned into its acidic form by exchange with ammonium acetate and subsequent calcination under the above indicated conditions.

The Pt metal phase is deposited on the beta zeolite by aqueous impregnation.

In particular, on 10 g of beta zeolite, 12.06 ml of an aqueous solution containing $H_2PtCl_6$ (0.45% Pt by weight/volume) and HCl (0.6M) is added dropwise, with careful mixing. The subsequent impregnation, drying and calcination steps are as disclosed in Example 1.

The characteristics of the resulting catalyst are reported in Table 1, in which "$SiO_2:Al_2O_3$" indicates the molar ratio of silica to alumina, and "Pore $d_m$" indicates the average diameter of the pores, expressed as Angstrom.

TABLE 1

| Cat. | Metal % w/w | Surface area (m²/g) | $SiO_2:AL_2O_3$ (m/m) | Pore volume (mL/g) | Pore $d_m$ (Å) |
|---|---|---|---|---|---|
| Ex. 1 | 0.52 | 674.6 | 100 | 0.44 | <30 |
| Ex. 2 | 0.58 | 496.3 | 100 | 0.44 | <30 |
| Ex. 3 | 0.27 | 485.9 | 100 | 0.44 | <30 |
| Ex. 4 | 0.25 | 590.4 | 100 | 0.44 | <30 |
| Ex. 5 | 0.51 | 626.3 | 28.3 | 0.75 | 7.5 × 5.7 6.5 × 5.6 |

EXAMPLE 6

The catalyst from Example 1 was tested in the reaction of hydroisomerization of $n-C_{16}$ paraffin, in a microautoclave, under the following conditions.

The microautoclave is constituted by a steel body and a cover provided with a plurality of valves for pressurization, venting and optional recovery of gas products, and a pressure relief disk. The stirring system is constituted by a thin internal metal rod.

The reactor is charged with 8 g of $C_{16}$ paraffin and 0.25 g of catalyst; the system is pressurized when cold with $H_2$ at 5 MPa and then is heated up to the temperature of 360° C.

As zero time, the point in time is considered when the temperature inside the reactor interior reaches the desired value. After 120 minutes, the reactor is cooled and the internal pressure thereof is relieved, and the reaction mixture is recovered. The analysis of the products in order to determine the conversion and their distribution is directly carried out on the mixture, by gas chromatography (crosslinked methyl silicone gum HP-1 column, atomic emission detector).

In Table 2, the values of conversion and selectivity are reported, which were computed as follows:

$$\text{n-}C_{16}\text{ conversion} = \frac{\text{unreacted n-}C_{16}\text{ peak surface area}}{\text{total hydrocarbon peak surface area}}$$

$$\text{selectivity to iso-}C_{16} = \frac{\text{produced iso-}C_{16}\text{ peak surface area}}{\text{total product peak surface area}}$$

$$\text{selectivity to }C_{16^-} = \frac{\text{produced }C_{16^-}\text{ peak surface area}}{\text{total product peak surface area}}$$

in which "iso-$C_{16}$" is the mixture of isomers containing 16 carbon atoms, and "$C_{16^-}$" is the mixture of cracking products, with less than 16 carbon atoms.

EXAMPLE 7

A catalyst according to Example 2 is tested in the hydroisomerization of n-$C_{16}$ paraffins. The reaction conditions are the same as in Example 6. The values of conversion and selectivity are reported in Table 2.

EXAMPLE 8

A catalyst according to Example 3 is tested in the hydroisomerization of n-$C_{16}$ paraffins. The reaction conditions are the same as in Example 6. The values of conversion and selectivity are reported in Table 2.

EXAMPLE 9

A catalyst according to Example 2 is tested in the hydroisomerization of n-$C_{16}$ paraffins. The reaction conditions are the same as in Example 7, except for the reaction time being extended to 240 minutes. The values of conversion and selectivity are reported in Table 2.

TABLE 2

| Example | Conversion % | Selectivity to iso-$C_{16}$ | Selectivity to $C_{16^-}$ |
|---|---|---|---|
| 6 * | 79.5 | 87.29 | 12.70 |
| 7 * | 19.0 | 94.48 | 5.52 |
| 8 * | 25.5 | 96.39 | 3.61 |
| 9 + | 26.3 | 95.67 | 4.33 |

Reaction conditions:
T = 360° C., $P_{H2}$ = 5 MPa, n-$C_{16}$: catalyst = 8:0.25;
* time = 120 minutes;
+ time = 240 minutes.

From Examples 6 and 7, one may observe how the metal phase deposition method has an influence on the conversion rate, with the operating conditions being the same. From Examples 8 (Pd containing catalyst) and 9 (Pt containing catalyst), one may observe that the hydrogenating function performed by palladium supplies the system with a slightly better hydroisomerizing performance than with platinum.

The processes described in technical literature for the hydroisomerization of waxes (e.g., U.S. Pat. No. 4,975,177 and EP-A-321,307) limit the conversion rates to values comprised within the range of from 20 to 40% by weight, in order to keep the cracking byproducts to their minimum; the catalysts from Examples 2 and 3 displayed such catalytic activities, which made it possible the resulting conversion rates to fall within the range taken into consideration, with extremely good selectivity values to iso-$C_{16}$ products.

EXAMPLE 10 (COMPARISON EXAMPLE)

The catalyst taken as the reference catalyst (Example 5) is tested in the hydroisomerization of n-$C_{16}$ paraffins. The reaction conditions are the same as in Example 6. The conversion rate and selectivity values are reported in Table 3.

EXAMPLE 11 (COMPARISON EXAMPLE)

The catalyst taken as the reference catalyst (Example 5) is tested in the hydroisomerization of n-$C_{28}$ paraffins. The reaction conditions are the same as in Example 6. The conversion rate and selectivity values are reported in Table 3.

EXAMPLE 12

A catalyst according to Example 1 is tested in the hydroisomerization of n-$C_{28}$ paraffins. The reaction conditions are the same as in Example 11. The values of conversion rate and selectivity are reported in Table 3.

TABLE 3

| Example | Conversion % | Selectivity to iso species | Selectivity to cracked species |
|---|---|---|---|
| 6 * | 79.5 | 87.29 | 12.70 |
| 10 * | 86.0 | 13.26 | 86.74 |
| 11 + | 98.1 | / | 100 |
| 12 + | 61.2 | 94.12 | 5.89 |

Reaction conditions:
T = 360° C., t = 120 minutes, $P_{H2}$ = 5 MPa, substrate: catalyst = 8:0.25.
* substrate = n-$C_{16}$;
+ substrate = n-$C_{28}$ From the tests of the Examples 6, 10, 11 and 12, it was verified that the catalysts according to the present invention (Examples 6 and 12) display a higher hydroisomerization selectivity, in the hydroisomerization of both n-$C_{16}$ and n-$C_{28}$ paraffins, with the operating conditions being the same, as compared to a catalyst taken as the reference catalyst (Examples 10 and 11).

EXAMPLE 13

A catalyst as from Example 1, is tested in the hydroisomerization of n-$C_{16}$ paraffins. The reaction conditions are kept equal to those as of Example 6 in order to verify the reproducibility of the process. The values of conversion rate and selectivity are reported in Table 4.

EXAMPLE 14

A catalyst as from Example 1, is first dried in an $N_2$ atmosphere at 300° C. and is subsequently tested in the hydroisomerization of n-$C_{16}$ paraffins. The reaction conditions are the same as of Example 6. The values of conversion rate and selectivity are reported in Table 4.

EXAMPLE 15

A catalyst as from Example 1, is first activated under a $H_2$ atmosphere at 400° C. and is subsequently tested in the hydroisomerization of n-$C_{16}$ paraffins. The reaction conditions are the same as of Example 6. The values of conversion rate and selectivity are reported in Table 4.

EXAMPLE 16

A catalyst as from Example 1, is first activated as in Example 15 and is subsequently tested in the hydroisomerization of n-$C_{16}$ paraffins. The reaction conditions are the same as of Example 15, except for the reaction time, which is reduced down to 60 minutes. The values of conversion and selectivity are reported in Table 4.

TABLE 4

| Example | Conversion % | Selectivity to iso-$C_{16}$ | Selectivity to $C_{16^-}$ |
|---|---|---|---|
| 6 | 79.5 | 87.29 | 12.7 |
| 13 | 79.4 | 86.52 | 13.48 |
| 14 | 72.0 | 89.03 | 10.97 |
| 15 | 72.2 | 90.44 | 9.56 |
| 16 * | 39.8 | 89.45 | 10.55 |

Reaction conditions:
T = 360° C., T = 120 minutes, $P_{H2}$ = 5 MPa, n-$C_{16:\ catalyst}$ = 8:0.25;
* t = 60 minutes.

From Examples 6 and 13, the extremely good reproducibility of the reaction system emerges.

From Examples 6, 14 and 15 one may observe that, against a yield decrease of 8% by weight, the selectivity ratio of iso-$C_{16}$:$C_{16^-}$ is favoured by an activating treatment, in particular by a reducing treatment (Example 15).

From Examples 15 and 16, it may be observed that halving the test time actually causes decrease in conversion rate, with the selectivity to iso-$C_{16}$ products remaining nearly constant.

We claim:

1. Bifunctional catalyst comprising:
   (a) a carrier of acidic character constituted by X-ray amorphous silica and alumina gel, with a molar ratio of $SiO_2$:$Al_2O_3$ in the range of from 30:1 to 500:1, a surface area in the range of from 500 to 1000 m²/g, with a porosity in the range of from 0.3 to 0.6 ml/g, with a prevailing pore diameter in the range of from 10 to 30 Angstroms;
   (b) one or more metals belonging to Group VIIIA, in amounts in the range of from 0.05 to 5% by weight.

2. Bifunctional catalyst according to claim 1, characterized in that the acidic carrier has a ratio of $SiO_2$:$Al_2O_3$ in the range of from 50:1 to 300:1 and a porosity in the range of 0.4–0.5 ml/g, and one or more group VIIIA metals selected from platinum or palladium is present at a level of from 0.1 to 2% by weight.

3. Catalyst according to claim 1 or 2, characterized in that it is used in combination with suitable inert solid materials as binding agents.

4. Process for preparing bifunctional catalyst according to claim 1 or 2, characterized in that said process comprises the following steps:

bringing the amorphous silica and alumina gel into contact with an aqueous solution of a compound of one or more group VIIIA metals, at about room temperature, and at a pH in the range of 1–4 units;

drying the so obtained treated silica and alumina gel;

heating said gel in an oxidizing atmosphere at temperatures in the range of from 200° to 600° C.

5. Process for preparing the bifunctional catalyst according to claim 1 or 2, characterized in that said process comprises the following steps:

suspending the amorphous silica and alumina gel in an aqueous solution of a complex or salt of one or more group VIIIA metals at about room temperature, and at a pH in the range of 6–10;

separating the resulting solid matter, washing it with water and drying it;

submitting the resulting solid matter to a thermal treatment under an inert or oxidizing atmosphere, at temperatures in the range of from 200° to 600° C.

6. Process for preparing the bifunctional catalyst according to claim 4 or 5, characterized in that it comprises a subsequent activation step, carried out by drying and/or reduction.

7. Process for preparing the bifunctional catalyst according to claim 6, characterized in that the activation step comprises a drying stage and a reduction stage.

* * * * *